March 12, 1963 KARL-HEINZ TIEDTKE 3,081,093

RECORD CHANGING DEVICE

Filed April 27, 1960 2 Sheets-Sheet 1

March 12, 1963 KARL-HEINZ TIEDTKE 3,081,093

RECORD CHANGING DEVICE

Filed April 27, 1960 2 Sheets-Sheet 2

3,081,093
Patented Mar. 12, 1963

3,081,093

RECORD CHANGING DEVICE

Karl-Heinz Tiedtke, Kiel-Elmschenhagen, Germany, assignor to Electroacustic Gesellschaft mit beschrankter Haftung, Kiel, Germany, a corporation of Germany Filed Apr. 27, 1960, Ser. No. 25,110
Claims priority, application Germany Sept. 21, 1959
14 Claims. (Cl. 274—10)

My invention relates to phonograph record changing devices, and more particularly to a turntable spindle for supporting a stack of record discs and sequentially releasing the discs so that the lowermost disc will drop onto the turntable.

The turntable spindle of the invention is intended for use with a record changing device wherein the spindle constitutes the sole means of support for the records which are held in readiness for playing. In a known device of this type, disclosed in Patent No. 2,845,271 of P. Scheller et al., issued July 19, 1958, a turntable spindle is equipped with supporting members which protrude from the spindle in radial directions and hold the stack of discs in position until the lowermost record is to be dropped. The supporting members are then withdrawn radially into the spindle, and clamping members are simultaneously urged out of the spindle against the penultimate record to retain the remainder of the stack until the lowermost record has cleared the supporting members which then return and accept the load of the remaining stack.

While record changer spindles of the above-mentioned type are generally satisfactory in operation, it has been found that the center holes in some record discs appreciably depart from the normal diameter and that the clamping of such records on the spindle is unreliable.

It is an object of my invention, therefore, to provide a spindle, generally of the type mentioned, that always reliably clamps the next to the lowermost record disc regardless of considerable differences in center-hole diameters of the record discs being stacked.

Another object of my invention is to provide a record changing device of the general type described in which the frictional forces are approximately equally distributed between the supporting and the clamping members, thus prolonging the useful life of the apparatus.

Another object is the reduction of the force required for actuating the changing operation of the record changer spindle.

A further object is the provision of a record changer spindle in which the supporting members and the clamping members jointly carry the weight of the stack during the entire operating cycle except for the short period during which the lowermost record is dropped onto the turntable.

Still another object is the provision of a changer spindle in which the weight of the records is substantially supported by the spindle and is not transmitted to the control rod which actuates radial movement of the supporting members and clamping members, thus reducing the forces to be transmitted by the control rod.

Another object of the invention is the provision of means which cause the clamping members to move radially outward of the changer spindle when a downward load is applied to the supporting members.

With these and other objects in view, and in accordance with my invention, I provide a record-changer spindle for supporting a stack of phonograph record discs which comprises an elongated tubular member arranged in an upright position in the normal operating condition of the changer. The tubular member encloses a control rod which is movable axially between two positions. A portion of a record-disc supporting member is secured to the rod for joint axial movement only, so that another portion of the supporting member is radially movable relative to the axis of the tubular member between a retracted position in which the latter portion of the supporting member is entirely contained within the tubular member, and a disc-supporting position in which it protrudes radially out of the tubular member.

A clamping member is provided at an axial distance from the projectable portion of the supporting member, and is radially movable between a retracted position and a protruding clamping position. The tubular member is formed with at least one radial opening suitable for passage of the relevant portions of the supporting and clamping members into and out of their respective retracted positions.

A resilient connecting means secures the control rod to the clamping member and urges the latter to move from the retracted toward the clamping position when the rod moves in one direction between its two axial positions. Guide means mounted on the tubular member guide the projectable portion of the supporting member when the control rod, and thus the secured portion of the supporting member, moves axially in the aforementioned direction. The guide means cause the projectable portion of the supporting member to move axially from one supporting position, that is a projecting position, at first to another supporting position, and hence to a retracted position.

According to an additional important feature of my invention, the guide means are also effective to move the control rod axially in the aforementioned direction when the projecting portion of the supporting member is moved from one to another of the two supporting positions mentioned above.

Other features and many of the attendant advantages of my invention will be readily appreciated as the same becomes better understood by reference to the following detailed description of a preferred embodiment thereof, when considered in connection with the accompanying drawings in which like reference numerals designate like parts throughout the figures thereof, and wherein.

Figure 1:
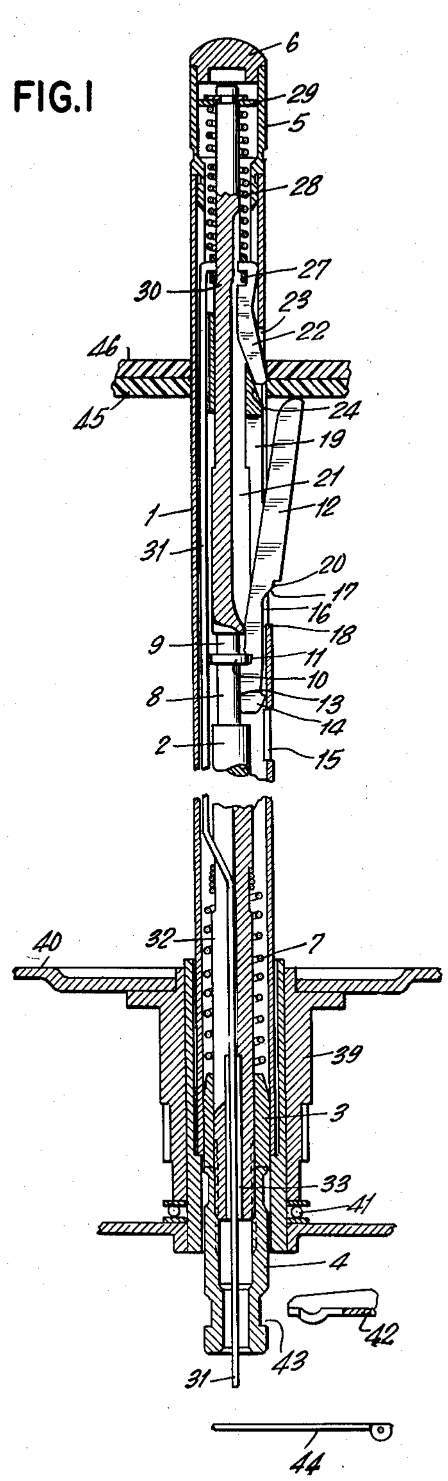
FIG. 1 shows a turntable spindle for a record changing device in axially sectional side elevation.

Referring now to the drawings in detail, the illustrated device comprises a cylindrical tube 1 dimensioned to pass with some clearance through the central hole of a phonograph record. The movable spindle elements are housed within the tube 1 and can be completely retracted within the cylindrical envelope so that a record can be passed over the tube 1 from its free top end to a turntable on which the spindle is mounted in the usual manner.

A control rod 2 is mounted in the tube 1 and extends substantially over the entire length of the tube. It projects beyond the bottom end of the tube and is guided at its lower end for axial movement in the tube by a tubular plug 3. The downwardly projecting portion of the rod 2 threadedly engages an actuating sleeve 4 having the shape of a cylinder with circumferential grooves, the purpose of which will become apparent later. The sleeve 4 is coaxial with the rod 2 and the tube 1.

A cap 5 is inserted into the open top end of the tube 5 and extends the tube beyond the uppermost portion of the rod 2. The cap 5 is closed by a plastic plug 6. This arrangement of the spindle top facilitates assembly and servicing since the cap 5 is held in the tube 1 by friction fit only, and the plug 6 is similarly removable and insertable without tools.

A helical return spring 7 abuts against the tubular plug 3 and against a shoulder on the control rod 2 so as to permanently urge the control rod to move in an upward direction until it abuts against the plastic plug 6 in a precisely defined position.

In the region above the spring 7, the control rod 2 is formed with two wide circumferential grooves 8 and 9 separated by a narrow ridge 10 which has the same diameter as the main portion of the control rod 2. The ridge 10 engages respective transverse notches 11 of three supporting blades 12 which are symmetrically arranged about the spindle axis. As best seen from FIG. 2, there is appreciable clearance between the ridge 10 and the walls of the notch 11 so that the blades 12 can pivot about their points of support on the ridge. The three pivoting axes extend in a common plane at right angles to the axis of the spindle.

The spindle of the invention fits within the hub bushing 39 of a turntable 40 which itself is supported by means of a ball bearing arrangement 41 on the changer frame. The actuating sleeve 4 extends beyond the hub bushing 39 so that its peripheral groove can be engaged by the throw-off lever 42, and the control rod 2 can be pulled downward against the opposition of the return spring 7 and of the helical spring 28, thus increasing the clamping pressure of the blades 22.

Figure 2:
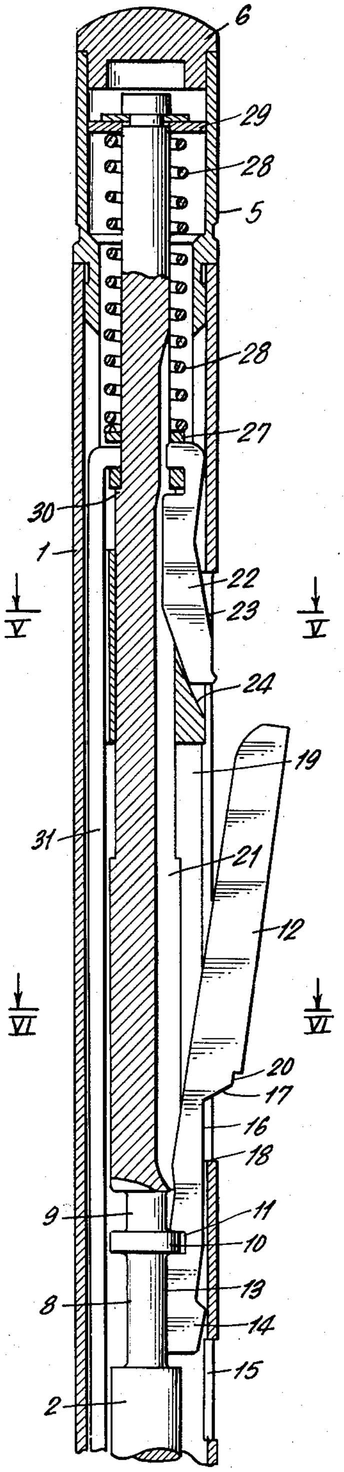
FIG. 2 shows a portion of the device of FIG. 1 on an enlarged scale in side-elevational axial section.

In the position shown in FIG. 2, each blade 12 is pivoted in a clockwise direction as far as possible. The radially inner edge 13 of the blade makes line contact with the bottom of the groove 8. The corresponding outer edge portion slopes radially inward from the level of the ridge 10 and then again sharply outward to form a projection 14 which is in contact with the inner wall of the tube 1. The blade 12 is thus axially secured by the ridge 10, and held in its angular position by guiding contact with the tube 1, or with structural elements connected therewith such as the control rod 2. When the control rod 2 is moved downwardly, the projection 14 of the supporting blade 12 is aligned with an axially elongated guide opening 15 in the tube 1, and the blade 12 is released to pivot counterclockwise about its pivot on the ridge 10.

The outer eoge 16 of the blade portion immediately above the ridge 10 is parallel to the axis of the tube 1 in the position illustrated in FIG. 2, and thus does not interfere with downward movement of the blade 12, nor with counterclockwise pivoting movement. The inner edge of the main portion of the blade 12 above the ridge 10 slopes outwardly from the spindle axis at an acute angle so that the blade tapers in an upward direction from the pivot to a section of minimum width from which the outer edge flares sharply outward to the full width of the main portion. The flaring edge portion 17 cooperates with a lower abutment edge 18 of an axial slot 19 in the tube 1 through which the main portion of the blade 12 projects outwardly. When the blades 12 are displaced axially downward by movement of the ridge 10, the camming coaction of the edge portion 17 with the abutment edge 18 causes the blades 12 to be pivoted about the ridge 10, and the main portion of the blades to be retracted into the tube 1.

Where the flaring edge portion 17 meets the straight outer edge of the main blade portion, a notch is broken out of each blade 12. The walls of this notch extend at right angles to each other in the direction of the main axis of the blade, and transversely thereto respectively. When the control rod 2 is moved downward from the position illustrated in FIG. 2, the notch 20 eventually comes to rest on the abutment edge 18 and thus limits the stroke of the blade 12, and of the rod 2. The retracted main portion of each blade 12 is received in an axial groove 21 of the control rod 2 which extends from a point adjacent the ridge 10 to a level near the top of the tube 1.

Figure 5:
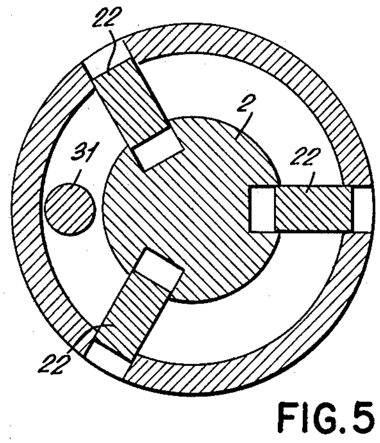
FIG. 5 is a sectional view, on an enlarged scale, of the device of FIG. 2 taken on the line V—V of FIG. 2.
Figure 6:
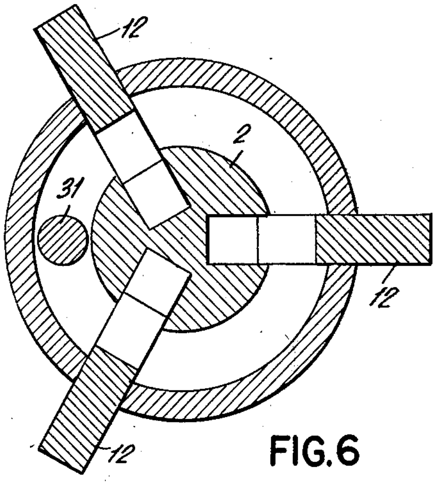
FIG. 6 is a corresponding sectional view taken on the line VI—VI of FIG. 2.

It is to be understood that this description relates to each one of three identically shaped and identically mounted blades 22 symmetrically arranged about the spindle axis, as is evident from FIG. 5. Each clamping blade 22 is arranged to be moved between a retracted position in which it is partly received within the corresponding groove 21, and a projected clamping position in which a clamping portion of the blade 22 extends radially beyond the circumference of the tube 1 through a slot 23 in the tube 1. The slot 23 is separated from the slot 19 by a wedge-shaped deflector member 24 which abuts against a cam face 25 of each blade 22 and guides pivoting movement of the blade 22 about an axis transverse to the spindle axis.

Figure 3:
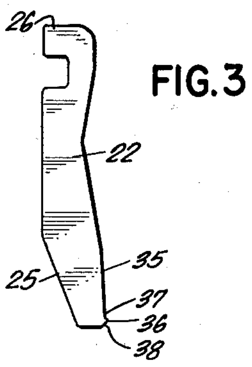
FIG. 3 illustrates a clamping blade of the device of FIGS. 1 and 2 in side elevation on a further enlarged scale.

As best seen in FIG. 3, the clamping blade 22 has a hook-shaped upper end portion 26 for pivotal suspension of the blade 22 from a collar 27 which is axially slidable on the top end portion of the control rod 2. The collar 27 is urged downwardly against a shoulder 30 of the control rod by a helical compression spring 28 which abuts at its other end against a spring plate 29 fastened to the upper end portion of the control rod 2. The spring plate 29 guides the rod end coaxially within the cap 5.

A disconnecting rod 31 is provided with a bent-over end portion which engages a mating radial opening in the collar 27. The rod 31 extends axially in a vertical direction down through the annular space between the control rod 2 and the tube 1, then bends and passes down, concentric with rod 2, through an axial groove 32 in that lower portion of the control rod 2 which is enveloped by the return spring 7, and finally through an axial bore in the rod 2 and in the sleeve 4 so that its lower end protrudes from the sleeve. Outward movement of the disconnecting rod 31 brings it into engagement with a switch-actuating lever to disconnect the turntable motor in a well known manner, as will be more fully described below.

The clamping member 22 is mounted on the control rod 2 in such a manner that its bottom portion is spaced from the support plane defined by the upper faces of the three supporting blades 12 by approximately the thickness of a phonograph record. There are no generally accepted standards for the thickness of commercial photograph records. The term "approximate thickness" thus will be deemed to encompass the range of record thicknesses most commonly encountered, and will be so understood by those skilled in this art.

Since the bottom edge of the clamping blade 22 is thus approximately aligned with the plane of separation between the lowermost record disc of a stack of records supported on the blades 12, the radially outer axial edge portion 35 of the clamping member 22 extends within the center hole of the penultimate record. When the clamping blade 22 is pivoted outward about the collar 27, it is the clamping edge portion 35 which makes clamping contact with the record disc. Because of the normally close fit between the center hole of a record and the turntable spindle, the normal pivoting stroke of the blade 22 extends only slightly beyond the cylindrical surface of the tube 1. The clamping edge 35 is so shaped that it is substantially parallel to the spindle axis when the blade 22 is in the normal clamping position, and is only inclined by a very small acute angle relative to a parallel position even when the center hole of a record is oversize.

If the penultimate record has an abnormally large center hole and the hole in the superimposed next record is of normal size, the angular slope of the clamping edge 35 may be inadequate to permit contact between the edge 35 and the internal circumference of the penultimate record in the center hole of the latter. To ensure adequate support for the penultimate record under such unfavorable conditions, the blade 22 is provided with a projecting lip 36 (FIG. 3) which has a sharp protruding edge lying in a plane perpendicular to the spindle axis. The flanking edge portion 37 which connects the sharp edge of the lip 36 with the clamping edge 35 has a very gentle slope. The deflector member 24, the cooperating cam face 25 of each clamping blade 22, and the pivot arrangement on the collar 27 are so arranged and shaped that the sharp edge of the lip 36 is retracted from the clamping position toward the spindle axis in a substantially radial direction, so that the flanking edge portion 37 does not exert any upward force on the penultimate record which would otherwise initially raise the remainder of the record stack while the clamping member was being withdrawn upwardly.

To provide the desirable shape of the sharp edge on the lip 36, the lower flank 38 of the lip 36 is inclined about equally toward the spindle axis and toward a plane perpendicular to the spindle axis, in virtually all operating positions of the clamping member 22. The lip 36 will thus always become wedged between the two lowermost record discs of a stack when the record discs are of adequate thickness. It will engage the peripheral edge of the center hole of the penultimate record disc if the thickness of the records is relatively small, or if the lip 36 has to compensate for a wide variation in center hole diameters as described above.

The operation of the record supporting spindle of the invention is as follows. A stack of record discs, of which only the lowermost disc 45 and the penultimate disc 46 are shown in FIG. 1, is slipped over the tube 1, and the lowermost record 45 receives three-point support from the supporting blades 12. Blades 12 are thus displaced downwardly by the weight of the records and entrain the control rod 2 by its ridge 10. Control rod 2 moves downwardly, the return spring 7 is compressed and the spring plate 29 also moves downwardly in the cap 5, exerting resilient pressure on the collar 27 through spring 28. As the shoulder 30 moves down with the rod 2, the blades 22 are moved downward and their bottom portions are swung radially outward by the deflector members 24. The clamping edges 35 of blades 22 engage the internal or center hole edge of the penultimate record 46. If the diameter of the center hole in the penultimate record 46 is substantially the same as, or not much greater than that of the center hole in the next superimposed record (not shown), then member 22 will occupy the position of FIG. 1, with the lower flange 38 of the lip 36 (FIG. 3) abutting against the internal edge of the lowermost record 45, and the sharp edge of lip 36 pressing from below against the edge of the penultimate record 36 so as to slightly separate the last two records. The side clamping edges 35 of blades 22 engage at least the penultimate record so that blades 22 always support the weight of the entire stack except for the lowermost record, which rests on the blades 12. The weight of the lowermost record 45 is sufficiently counterbalanced upwardly by the spring 7 so that the blades 12 cannot be depressed so far down as to cause them to be retracted radially by engagement of their flared edge portions 17 with the lower abutment edge 18 of the slot 19. The clamping effect of the blades 22 on the records above the bottom one relieves the supporting blades 12 of the major portion of the record weight before blades 12 reach their lower limit of axial movement, without any accompanying outward pivoting displacement.

When a new record 45 is to be dropped from the stack onto the turntable 40 (FIG. 1), the control devices of the changer actuate a pivotable throw-off lever 42 in a known manner to disengage it from shoulder 43 of sleeve 4.

Figure 4:
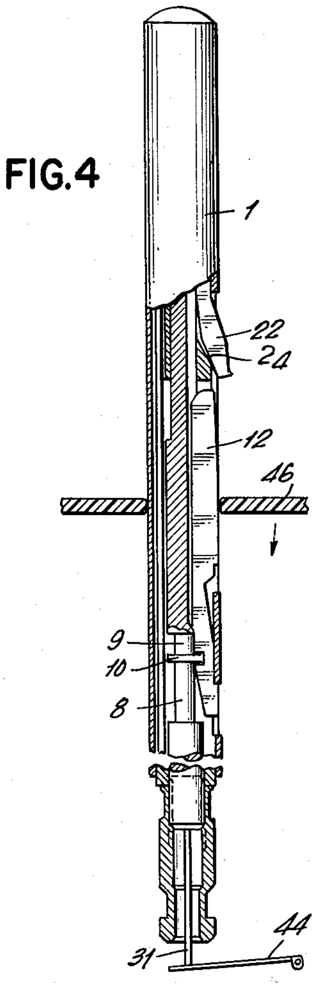
FIG. 4 shows, partly in axial section, the apparatus of FIG. 1, during the fall of the last record.

The downward movement of the control rod 2 brings the flared edge portions 17 of the supporting blades 12 into cooperation with the abutment edges 18 of the three slots 19, and the blades 12 are radially retracted when the projections 14 reach alignment with the openings 15. By the time the shoulders of notches 20 abut against the edges 18, the lowermost record is no longer supported on blades 12 and is free to drop on the turntable 40, as shown in FIG. 4.

The changer controls (not shown) then release the throw-off lever 42 from entrainment on shoulder 43, and the return spring 7, assisted by the spring 28, quickly moves the control rod 2 upward. The supporting blades 12 again project from their respective slots 19. Shortly before the rod 2 resumes its uppermost position illustrated in FIG. 2, its shoulder 30 impinges on the collar 27. The force of return spring 7 together with the stored energy of the rapidly moving masses of the rod 2 and of the elements attached thereto withdraws blades 22 radially and thus breaks the clamping engagement of the blades 22 with the records held thereby. The slope of the face of the deflector member 24 which is in engagement with the cam face 25 of the clamping blade 22 is designed in such a manner that the connection between 24, 22 and the tube 1 is not self-locking, that is the slope of deflector 24 is greater than the angle of friction so that the force required for releasing the clamping records need not be very great.

As soon as the clamping blades 22 are retracted, the remaining stack of records drops the distance of one record thickness onto the supporting blades 12, which are again displaced in a downward direction, the clamping members 22 are again actuated, and the aforedescribed cycle of operations is repeated.

When all records including the last have been dropped onto the turntable 40, the pivoting stroke of the blades 22 is no longer limited by abutment against the internal circumference of a record, and the slidable collar 27 then remains in contact with the shoulder 30 under the downward urging force of the spring 28. When the control rod 2 is pulled downward by entrainment with the throw-off lever 42 on shoulder 43, the disconnecting rod 31 is moved into contact with the switch actuating lever 44 and disconnects the turntable motor (not shown) in the customary manner.

I have found that the wear of the supporting blades 12 is greatly reduced by thus reducing the load carried by the blades while they are being retracted, so that for throwing off the lowermost record 45, they carry only the weight of this one record. The force required to actuate movement of the blades 22 and 12 is equally reduced, and weaker return springs are adequate, as compared to those heretofore necessary. The weight of the records is largely transferred to and supported by the tubular member of the spindle and absorbed by friction. Only a small portion of the record weight is directly or indirectly transmitted to the control rod. The changing mechanism thus operates more smoothly, faster and quieter than an otherwise similar mechanism not equipped with the record supporting turntable spindle of the invention.

It should be understood, of course, that the foregoing disclosure relates to only a preferred embodiment of my invention, and that it is intended to cover all changes and modifications of the example of the invention herein chosen for the purpose of the disclosure which do not constitute departures from the spirit and scope of the invention set forth in the appended claims.

I claim:

1. A gramophone record changing device, comprising a turntable spindle for supporting a stack of record discs, said spindle having an upright tubular member provided in its upper portion with vertically spaced groups of longitudinal slots, each group consisting of more than two slots located in different axial planes of said member; a control rod longitudinally displaceable within said tubular member and projecting downwardly out of said tubular member; resilient supporting means on said control rod for urging same upward; two vertically spaced groups of radially displaceable blade members distributed about the periphery of and disposed within said tubular member, each of said blade members having at least a portion thereof positioned opposite a respective one of said slots for radial displacement therethrough, the upper group of blade members forming record clamping members and the lower group of blade members forming supporting members for said stack of discs; said tube forming blade control surfaces at respective terminal edges of at least some of said slots for controlling the motion of respective blade members, sad groups of blade members having respective first and second means pivotally coupling same to said control rod so as to move said blade members simultaneously with said rod in at least one displacing direction of said rod, said clamping members extending downwardly from said first coupling means in said different respective axial planes and being elastically displaceable radially in said respective planes in opposition to the urging force of said resilient supporting means, each of said clamping members having at its lower portion an outwardly projecting lip movable through one of said respective slots of said tubular member for clampingly engaging the periphery of the center hole of at least the penultimate record disc of said stack; deflector means within said tubular member for guiding the longitudinal and radial movement of said clamping members, said clamping members each having an inclined cam face engageable with said deflecting means; the blade members of said group of supporting members each having a record supporting portion extending upwardly from said second coupling means in respectively different axial planes and having a top face for supporting the record stack when said supporting members are in radially extended position; each of said supporting members being provided with a control surface so shaped as to be engageable with a respective one of said blade control surfaces only after the respective supporting member has moved downwardly and radially outward a predetermined distance; an abutment fastened to said control rod, said first coupling means being axially displaceable on said rod, said resilient supporting means surrounding said control rod and having one end abutting against said abutment and the other end against said first coupling means to exert biasing pressure in at least one direction of rod motion upon said first coupling means.

2. A gramophone record changing device, comprising a turntable spindle for supporting a stack of record discs, said spindle having an upright tubular member provided in its upper portion with vertically spaced groups of longitudinal slots, each group consisting of more than two slots located in different axial planes of said member; a control rod longitudinally displaceable within said tubular member and projecting downwardly out of said tubular member; resilient supporting means on said control rod for urging same upward; two vertically spaced groups of radially displaceable blade members distributed about the periphery of and disposed within said tubular member, each of said blade members having at least a portion thereof positioned opposite a respective one of said slots for radial displacement therethrough, the upper group of blade members forming record clamping members and the lower group of blade members forming supporting members for said stack of discs; said tube forming blade control surfaces at respective terminal edges of at least some of said slots for controlling the motion of respective blade members, said groups of blade members having respective first and second means pivotally coupling same to said control rod so as to move said blade members simultaneously with said rod in at least one displacing direction of said rod; said first coupling means comprising sleeve means surrounding said control rod and joined to said resilient supporting means and therethrough with said control rod for elastic axial displacement relative to said control rod and so as to resiliently follow the displacing movements of said control rod in at least one direction of motion; said clamping members extending downwardly from said first coupling means in said different respective axial planes and being elastically and pivotally displaceable radially in said respective planes in opposition to the urging force of said resilient supporting means, each of said clamping members having at its lower portion an outwardly projecting lip movable through one of said respective slots of said tubular member for clampingly engaging the periphery of the center hole of at least the penultimate record disc of said stack; deflector means within said tubular member for guiding the longitudinal and radial movement of said clamping members, said clamping members each having an inclined cam face engageable with said deflecting means in such manner that the free ends of said clamping members during downward motion of the latter protrude out through respective slots in said tubular member; the blade members of said group of supporting members each having a record supporting portion extending upwardly from said second coupling means in respectively different axial planes and having a top face for supporting the record stack when said supporting members are in radially extended position; each of said supporting members being provided with a control surface so shaped as to be engageable with a respective one of said blade control surfaces only after the respective supporting member has moved downwardly and radially outward a predetermined distance; an abutment fastened to said control rod, said resilient supporting means surrounding said control rod and having one end abutting against said abutment and the other end against said sleeve to exert biasing pressure upon said sleeve means.

3. A record changing device according to claim 1, each of said clamping members being provided with a record-clamping edge located above said projecting lip, said clamping edge in the outwardly displaced position of said clamping members extending approximately parallel to the axis of said tubular member and thus approximately parallel to a line along the center hole edges of the record discs of said stack.

4. A record changing device according to claim 3, each clamping member having an intermediate flanking edge portion located between and joining said outwardly projecting lip and said clamping edge, said flanking edge portion having a relatively gentle slope, said deflector means and said cam face cooperating therewith being so shaped and spaced from said first coupling means that said lip is retractable in a substantially radial direction, whereby no lifting motion of the stack of record discs will take place when said clamping members are radially withdrawn into said tubular member.

5. A record changing device according to claim 3, said clamping members each being provided with a lower flanking edge and an upper flanking edge located respectively below and above said lip, said lower and upper flanking edges in substantially all operating positions of said clamping member being each approximately equally inclined toward the longitudinal axis of said tubular member and toward a plane perpendicular to said latter axis, whereby said upper flanking edge will define an acute angle with said line along the center hole edges in such manner that said lip will always be the first portion of said clamping member to engage the center hole edge of a respective record disc.

6. A record changing device according to claim 2, said sleeve means comprising a bearing bushing arranged for free axial gliding motion on said control rod, said clamping members being pivotally suspended from said bushing, and a switch-off rod connected to said bushing and longitudinally displaceable within and extending out of the bottom of said tubular member for longitudinal displacement a predetermined amount to switch off the record changing device in accordance with a given position of said clamping members, whereby upward movement of said switch-off rod will move said bushing upwardly so as to radially retract said clamping members.

7. A record changing device according to claim 1, said second coupling means comprising a ridge formed on said control member, said supporting members being suspended on said ridge.

8. A gramophone record changing device, comprising a turntable spindle for supporting a stack of record discs, said spindle having an upright tubular member provided in its upper portion with vertically spaced groups of longitudinal slots and with two vertically spaced groups of blade members disposed within said tubular member in symmetrically spaced different axial planes and radially movable for displacement outwardly through respective ones of said longitudinal slots, the upper group of said blade members forming disc clamping members and the lower group forming supporting members for said stack of discs; an actuating rod operably linked to said respective groups of blade members for controlling and simultaneously moving said blade member, said rod being longitudinally displaceable within and projecting downwardly out of said tubular member; said supporting members each having formed lateral edges engageable with the terminal edges of respective longitudinal slots, said supporting members being each linked with said actuating rod for simultaneous constrained movement thereby together with said clamping members in a longitudinal and radial direction in accordance with the contour of said formed edges so that said clamping members and supporting members are all displaced downwardly upon downward movement of the latter; and deflector means within said tubular member for guiding the movements of said clamping members, whereby said clamping members in their outwardly displaced position serve to engage the peripheries of the center holes of said stack of discs at the same time that said supporting members in their outwardly displaced position serve to support at least the lowermost disc of said stack.

9. A gramophone record changing device, comprising a turntable spindle for supporting a stack of record discs, said spindle having an upright tubular member provided in its upper portion with vertically spaced groups of longitudinal slots and with two vertically spaced groups of blade members disposed within said tubular member in symmetrically spaced axial planes and radially movable for displacement outwardly through respective ones of said longitudinal slots, the upper group of said blade members forming disc clamping members and the lower group forming supporting members for said stack of discs; an actuating rod operably linked to said respective groups of blade members for controlling and simultaneously moving said blade members, said rod being longitudinally displaceable within and projecting downwardly out of said tubular member; said supporting members each having formed lateral edges engageable with the terminal edges of respective longitudinal slots, said supporting members being each linked with said actuating rod for constrained movement thereby in a longitudinal and radial direction a predetermined distance in accordance with the contour of said formed edges; and deflector means within said tubular member for guiding the movements of said clamping members, and resilient supporting means on said control rod for urging same to a predetermined position, whereby said clamping members in their outwardly displaced position serve to engage the peripheries of the center holes of said stack of discs and said supporting members in their outwardly displaced position serve to support at least the lowermost disc of said stack.

10. A device according to claim 9, said formed lateral edges of said supporting members including an abutment surface engageable with the terminal edge of a respective longitudinal slot to halt downward movement of said supporting members and thus of said actuating rod at respective predetermined locations.

11. A gramophone record changing device, comprising a turntable spindle for supporting a stack of record discs, said spindle having an upright tubular member provided in its upper portion with vertically spaced groups of longitudinal slots and with two vertically spaced groups of blade members disposed within said tubular member in symmetrically spaced axial planes and radially movable for displacement outwardly through respective ones of said longitudinal slots, the upper group of said blade members forming disc clamping members and the lower group forming supporting members for said stack of discs; an actuating rod operably linked to said respective groups of blade members for controlling the movement of said blade members, said rod being longitudinally displaceable within and projecting downwardly out of said tubular member; said supporting members each having formed lateral edges engageable with the terminal edges of respective longitudinal slots, said supporting members being each linked with said actuating rod for constrained simultaneous movement thereby in a longitudinal and radial direction in accordance with the contour of said formed edges; and deflector means fixed to the inner wall of said tubular member for guiding the movements of said clamping members; a sleeve bushing mounted on the upper portion of said actuating rod for movement therewith, one end of each of said clamping members being pivotally coupled with said bushing, the free end of each clamping member being provided with an inclined control surface engageable with said deflector means for deflecting said clamping members outwardly through respective slots upon downward movement of said actuating rod, whereby said clamping members in their outwardly displaced position serve to engage the perpiheries of the center holes of said stack of discs and said supporting members in their outwardly displaced position serve to support at least the lowermost disc of said stack.

12. A device according to claim 11, including an abutment fastened to the upper portion of said actuating rod, said sleeve bushing surrounding said actuating rod, resilient supporting means comprising a helical spring surrounding said rod and having one end abutting against said abutment and the other end fastened to said sleeve bushing, whereby said sleeve bushing and thus said clamping members are resiliently movable with said actuating rod.

13. A gramophone record changing device, comprising a turntable spindle for supporting a stack of record discs, said spindle having an upright tubular member provided in its upper portion with vertically spaced groups of longitudinal slots and with two vertically spaced groups of blade members disposed within said tubular member in symmetrically spaced different axial planes and radially movable for displacement outwardly through respective ones of said longitudinal slots, the upper group of said blade members forming disc clamping members and the lower group forming supporting members for said stack of discs; an actuating rod operably linked to said respective groups of blade members for controlling the movement of said blade members, said rod being longitudinally displaceable within and projecting downwardly out of said tubular member; said supporting members each having formed lateral edges engageable with the terminal edges of respective longitudinal slots, coupling means comprising a notch and notch-engaging member for pivotally linking said supporting members and said actuating rod for simultaneous movement of said supporting members in accordance with the contour of said formed edges and in constrained connection with said actuating rod relative to the longitudinal displacement direction of the latter but pivotable radially outward on said coupling means through said respective longitudinal slots; and deflector means within said tubular member for guiding the movements of said clamping members, a sleeve bushing surrounding the upper portion of said actuating rod, an abutment fastened to the upper portion of said actuating rod, resilient supporting means comprising a helical spring surrounding said rod and having one end abutting against said abutment and the other end fastened to said sleeve bushing, whereby said sleeve bushing is resiliently movable with said actuating rod, said actuating rod having a shoulder for limiting the downward motion of said sleeve bushing under urging force of said helical spring, said formed lateral edges of said supporting members including an abutment surface engageable with the terminal edge of a respective longitudinal slot to halt downward movement of said supporting members and thus of said actuating rod at respective predetermined locations.

14. A device according to claim 11, said tubular member being of substantially uniform outer diameter and continuous throughout its length, said deflecting means being integral with the wall of said tubular member and bent in therefrom.

References Cited in the file of this patent

UNITED STATES PATENTS

| | | |
|---|---|---|
| 2,604,325 | Hansen | July 22, 1952 |
| 2,689,735 | Morrison | Sept. 21, 1954 |
| 2,845,271 | Scheller et al. | July 29, 1958 |
| 2,921,794 | Menke | Jan. 19, 1960 |
| 2,981,953 | Hansen | Apr. 25, 1961 |

FOREIGN PATENTS

| | | |
|---|---|---|
| 117,847 | Sweden | Dec. 24, 1946 |
| 656,488 | Great Britain | Aug. 22, 1951 |